United States Patent [19]

Sears

[11] 4,167,972
[45] Sep. 18, 1979

[54] WELL SCREEN MOUNTING ARRANGEMENT

[75] Inventor: Joe S. Sears, Ventura, Calif.

[73] Assignee: UOP Inc., Des Plaines, Ill.

[21] Appl. No.: 863,813

[22] Filed: Dec. 23, 1977

[51] Int. Cl.$^2$ ............................................. E21B 43/08
[52] U.S. Cl. .................................................. 166/233
[58] Field of Search ................ 166/227, 230, 231–233, 166/234; 210/297

[56] References Cited

U.S. PATENT DOCUMENTS

| 3,741,300 | 6/1973 | Wolff et al. | 166/234 |
| 3,901,320 | 8/1975 | Calderon et al. | 166/234 |
| 3,908,256 | 9/1975 | Smith | 166/233 |
| 3,937,281 | 2/1976 | Harnsberger | 166/233 |

Primary Examiner—William Pate, III
Attorney, Agent, or Firm—James R. Hoatson, Jr.; Barry L. Clark; William H. Page, II

[57] ABSTRACT

Mounting arrangement for a pipe base well screen utilizes a weld for joining one end of a cylindrical screen member to the outer surface of an internal pipe member which has perforations along a portion of its length underlying the well screen. The opposite free end of the screen member includes an elongated sleeve portion which supports an internal elastomeric O-ring member in a groove. The O-ring seals the screen member to an unperforated portion of the pipe base and permits the pipe to be subjected to substantial tensile and torsional stresses without destroying the screen as often happens when a screen is welded at each of its ends.

4 Claims, 1 Drawing Figure

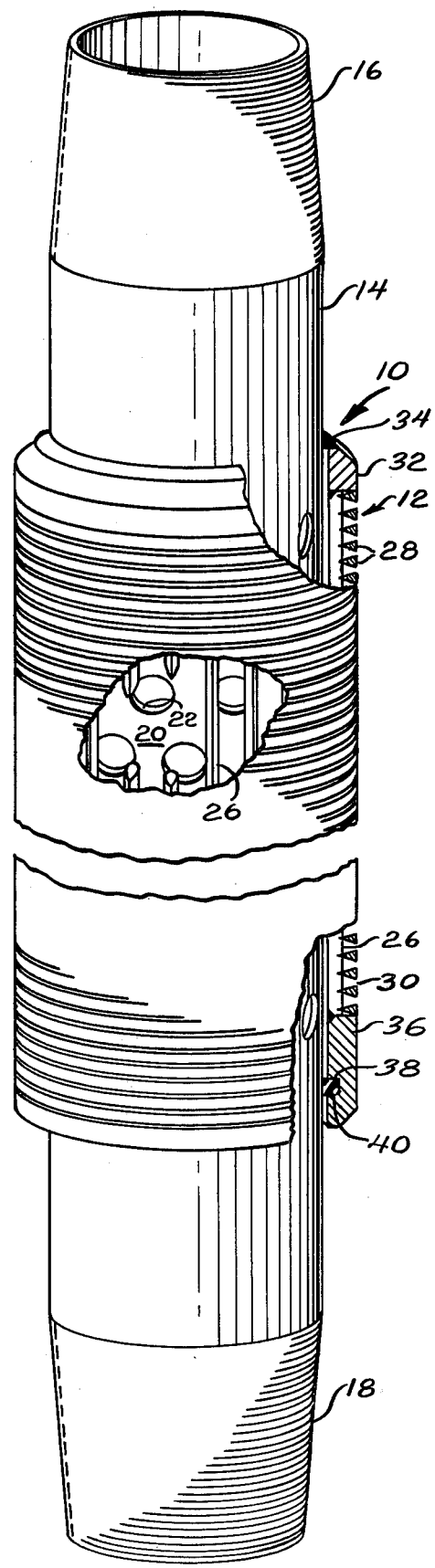

WELL SCREEN MOUNTING ARRANGEMENT

BACKGROUND OF THE INVENTION

The invention relates to well screens and particularly to well screens having a perforated pipe base of the type commonly used in the production of oil and gas. For many years, spiral wound well screens of the type disclosed in Johnson U.S. Pat. No. 2,046,458 have been used in water wells for permitting the passage of water through the surface of the screen and into a pipe connected at the upper end thereof which carries the water to the surface. Wells for the production of water are generally of much shallower depths than those used for the production of oil and gas and there is usually very little cause to withdraw the well pipe and attached screen once the well is completed. The situation is far different in the production of oil and gas since such wells often extend many miles below the surface of the earth. The greater depth of the wells requires that the well screens and pipes have a much greater resistance to compressive, tensile and torsional loading than is the case with water wells. In actual practice it seems that in more than 50% of the wells drilled that some reason develops for removing a pipe and screen after it has been installed. Since a gravel pack is usually provided around the well screen to provide additional filtering effect, it is obvious that very large loads have to be applied to lift the pipe string out of the gravel pack. Although the well screens used in such situations, such as the "super-weld" screens sold by Johnson Division of UOP Inc., usually have their strength greatly enhanced by being welded at each end to a length of perforated pipe to which they are telescopically attached, it has been found that very large tensile loads can cause the pipe to elongate and break away from the well screen. This type of failure destroys the usefulness of the well screen and opens a large gap between the screen and the underlying pipe perforations through which undesired materials such as sand may enter. The failure may take place even though the pipe usually has a much lower tensile strength per unit of cross-sectional area than does the well screen. The longitudinal rod portions of the well screen are generally made of stainless steel having a generally higher tensile strength that the typical API grade J-55 steel used in the pipe base. However, since the pipe base has a much greater cross-sectional area available to absorb tensile loading than the area of the well screen rods, the pipe base will tend to elongate while the well screen will fail at the juncture of its rods with one of the end support rings.

Failure of a well screen under excess tensile forces can result in displacement of the well screen rods and wrap wire from their usual positions into positions where they can greatly interfere with removal of the pipe from the well or with the attachment of "fishing" tools. Thus, it is preferable to design the well screen so that the integrity of the screen will be preserved and that any failure will take place, not in the screen portion of the assembly, but by a stripping of the threads by which the pipe base of the screen is mounted to the adjoining length of pipe or screen in the pipe string. The thread stripping mode of failure is preferred since it does not interfere with the attachment of "fishing" tools.

SUMMARY OF THE INVENTION

It is among the objects of my invention to provide an improved pipe base well screen assembly where the well screen member is mounted to its underlying pipe base member in such a way that excessive loads applied in tension or torsion while removing the screen from a well will not result in damage to the well screen per se.

The foregoing and other objects are obtained by the improved well screen mounting arrangement of the present invention wherein a section of spiral wrapped well screen is mounted to an underlying perforated pipe base member by means of a pair of cylindrical end rings. The upper end ring is welded to the pipe base in the usual fashion but the lower ring is somewhat elongated and includes an internal groove for supporting an annular elastomeric O-ring of Viton or other high temperature rubber-like material. The O-ring permits one end of the screen member to move freely relative to the underlying pipe base so that excess loads applied to the pipe base while trying to remove the screen assembly from a well cannot destroy the integrity of the connections of the well screen support bars, wire wrap and end rings. Alternatively, the lower end ring could be welded and the upper end left free but such an arrangement would tend to permit excess compressive loading to be applied to the screen element if the free top end of the screen encountered a restriction as it was pulled upwardly. Restrictions in the installation or lowering direction are of no particular concern since the pipe string is merely lowered through a casing. The principal restrictions arise after a gravel pack is installed around the screen and a need then arises to raise the pipe string. Thus, it is preferable that the screen be fixed at the upper end and free at the lower end.

BRIEF DESCRIPTION OF THE DRAWING

The drawing is a partially sectioned, partially broken away perspective view of a well screen assembly showing the relationship between the well screen portion and an underlying perforated pipe base member.

DESCRIPTION OF THE PREFERRED EMBODIMENT

Referring to the drawing, the well screen assembly indicated generally at 10 comprises a well screen portion indicated generally at 12 mounted in overlying telescopic relationship with a perforated pipe base member 14. The pipe base member 14 has a threaded upper end portion 16 and a threaded lower end portion 18. A perforated portion 20 having a plurality of perforations 22 underlies the well screen portion 12 and provides access to the inside of pipe 14 for fluids passing radially inwardly through screen portion 12.

The well screen portion 12 is formed of longitudinal rods 26 which are welded in conventional manner to a helically wound wrap wire 28 so as to form a plurality of slots or openings 30. The rods 26 and the wire wrap 28 are welded at their upper ends to an upper ring member 32 which is in turn welded to the upper portion of the pipe base 14 by an annular welded portion 34. The lower ends of the rods 26 and wire wrap 28 are welded to a lower ring member 36 which is of greater axial extent than the upper ring 32 and includes a ring groove portion 38 on its inner surface into which an elastomeric O-ring member 40 is inserted. The elastomeric O-ring member 40 should preferably be made of a material capable of withstanding the environment in which it is subjected for an indefinite period. A high temperature rubber material such as that sold under the trademark Viton should be suitable.

As previously discussed, well screens used in the oil well industry are generally positioned inside a casing (not shown) and surrounded by a gravel pack (not shown) which would extend somewhat upwardly above the upper ring portion 32. Obviously, such a gravel pack would exert a large restraining force against any effort to lift the pipe base member 14 upwardly. Because of the slip fit rather than rigid connection between the screen 12 and pipe 14 in the vicinity of the O-ring 40, no stresses can be developed between the screen member 12 and the pipe 14 which will cause the rods 26 or wrapping wire 28 to separate from the ring 32 as could happen if the screen 12 were welded at each end to the pipe 14. Thus, any failure from upwardly applied pulling loads will result in stripping of the threads in the threaded upper end portion 16 and make it relatively easy to remove the well screen assembly 10 with a "fishing" tool.

I claim as my invention:

1. A well screen assembly comprising an elongated tubular pipe base portion which is threaded at at least its upper end for attachment to an adjacent member in a pipe string and which has an arrangement for spaced perforations along a portion of its length; a well screen portion overlying said spaced perforations, said well screen portion having longitudinal support rods and a spiral wrapped wire overlying said rods and being welded thereto to define the open slot area of the screen; a ring member on each end of said screen portion; one of said ring members being welded to an unperforated portion of said pipe base portion positioned axially beyond one end of said arrangement of perforations and the other of said ring members overlying an unperforated portion of said pipe base portion positioned axially beyond the opposite end of said arrangement of perforations; said other of said ring members carrying a radially inwardly projecting sealing means which bears against said pipe base portion and seals the space between the pipe base portion and the said other ring member to prevent flow therethrough while permitting relative axial movement of said pipe base portion and said well screen portion when tensile loads sufficient to elongate said pipe base portion are applied to said pipe base portion.

2. A well screen assembly in accordance with claim 1 wherein said welded ring member is positioned near the upper end of the pipe base portion.

3. A well screen assembly in accordance with claim 1 wherein said sealing means comprises an elastomeric ring.

4. A well screen assembly in accordance with claim 3 wherein said elastomeric ring is mounted in a radially inwardly facing groove in said other of said ring members.

* * * * *